(12) United States Patent
Kimura (10) Patent No.: US 8,456,770 B2
(45) Date of Patent: Jun. 4, 2013

(54) METHOD OF SWITCHING FROM IMMERSION OBJECTIVE LENS TO DRY OBJECTIVE LENS

(75) Inventor: Hiroyuki Kimura, Tokyo (JP)

(73) Assignee: Olympus Corporation, Tokyo (JP)

( * ) Notice: Subject to any disclaimer, the term of this patent is extended or adjusted under 35 U.S.C. 154(b) by 201 days.

(21) Appl. No.: 12/603,652

(22) Filed: Oct. 22, 2009

(65) Prior Publication Data

US 2010/0103510 A1    Apr. 29, 2010

(30) Foreign Application Priority Data

Oct. 27, 2008    (JP) ................................ 2008-275953

(51) Int. Cl.
*G02B 7/14* (2006.01)
(52) U.S. Cl.
USPC .......................................... 359/821; 359/900
(58) Field of Classification Search
USPC .......................................... 359/381, 821, 900
See application file for complete search history.

(56) References Cited

U.S. PATENT DOCUMENTS

| | | | | |
|---|---|---|---|---|
| 6,133,561 A * | 10/2000 | Toshimitsu et al. | ........ | 250/201.3 |
| 6,268,958 B1 * | 7/2001 | Furuhashi | ...................... | 359/381 |
| 6,636,352 B2 * | 10/2003 | Engelhardt | .................... | 359/380 |
| 7,327,514 B2 * | 2/2008 | Uhl et al. | ....................... | 359/381 |
| 2005/0179997 A1 * | 8/2005 | Komatsu et al. | ............... | 359/368 |
| 2006/0274424 A1 * | 12/2006 | Okazaki et al. | ............... | 359/661 |
| 2006/0291041 A1 * | 12/2006 | Berns et al. | .................... | 359/368 |
| 2007/0159686 A1 | 7/2007 | Fiedler et al. | | |
| 2007/0206279 A1 * | 9/2007 | Brueck et al. | ................. | 359/391 |
| 2008/0170292 A1 * | 7/2008 | Harada et al. | ................. | 359/391 |
| 2008/0259327 A1 * | 10/2008 | Brueck et al. | .............. | 356/237.5 |
| 2010/0027109 A1 * | 2/2010 | Liebel et al. | ................... | 359/381 |
| 2010/0083410 A1 * | 4/2010 | Hattori et al. | ...................... | 850/1 |
| 2011/0109960 A1 * | 5/2011 | Shirota | .......................... | 359/381 |

FOREIGN PATENT DOCUMENTS

| | | |
|---|---|---|
| EP | 1 703 311 A1 | 9/2006 |
| JP | 10-221611 A | 8/1998 |
| JP | 11-038325 A | 2/1999 |
| JP | 2004-070307 A | 3/2004 |
| JP | 2004-317661 A | 11/2004 |
| JP | 2007-133077 A | 5/2007 |
| JP | 2008-170867 A | 7/2008 |
| WO | WO 2005/062104 A1 | 7/2005 |
| WO | WO 2006005703 A1 * | 1/2006 |

OTHER PUBLICATIONS

European Search Report dated Dec. 22, 2009 issued in counterpart European Application No. 09013423.
Japanese Office Action dated Aug. 28, 2012 issued in counterpart Japanese Application No. 2008-275953.

* cited by examiner

*Primary Examiner* — Mark Consilvio
(74) *Attorney, Agent, or Firm* — Holtz, Holtz, Goodman & Chick, PC (57) ABSTRACT

A microscope apparatus capable of removing liquid from an observation field of view of a dry objective lens, when an immersion objective lens is switched to the dry objective lens, is provided. The microscope apparatus includes a specimen XY stage on which a specimen is placed, a dry objective lens and an immersion objective lens that collect light from the specimen, a movable revolver that selectively disposes one of these objective lenses at a position facing the specimen, and a control unit that controls the specimen XY stage and movable revolver such that the relative positions in the XY direction are changed until the immersion objective lens is disposed at a non-observation region of the dry objective lens, prior to switching of these objective lenses.

2 Claims, 6 Drawing Sheets

METHOD OF SWITCHING FROM IMMERSION OBJECTIVE LENS TO DRY OBJECTIVE LENS

BACKGROUND OF THE INVENTION

1. Field of the Invention

The present invention relates to a microscope apparatus including an immersion objective lens and a dry objective lens.

This application is based on Japanese Patent Application No. 2008-275953, the content of which is incorporated herein by reference.

2. Description of Related Art

Conventionally, immersion microscopes used by filling the space between the tip of the objective lens and a specimen with liquid are known (for example, see Japanese Unexamined Patent Applications, Publication Nos. 2004-70307 and 2007-133077). Because such immersion microscopes have high effective numerical apertures (NAs), the resolution of detection optical systems can be increased.

Meanwhile, there is a market demand by people who want to perform macro observation on the same specimen using a low-magnification dry objective lens used in a dry state, after performing high-magnification observation on a local region using an immersion objective lens. However, when the immersion objective lens is switched to the dry objective lens to perform observation, liquid remains on a cover glass carrying the specimen, resulting in an inconvenience that a suitable observation field of view cannot be ensured in a dry state.

Japanese Unexamined Patent Application, Publication No. 2004-70307 discloses the technical content of an immersion objective lens only and does not mention switching from the immersion objective lens to a dry objective lens. Although Japanese Unexamined Patent Application, Publication No. 2007-133077 mentions the technique of supplying and collecting an immersion medium, it also discloses the technical content of the immersion objective lens only and does not mention switching to a dry objective lens.

BRIEF SUMMARY OF THE INVENTION

The present invention can provide a microscope apparatus capable of removing liquid from an observation field of view of a dry objective lens, when an immersion objective lens is switched to the dry objective lens. In addition, the present invention can provide a microscope apparatus capable of the observation of the specimen with the dry objective lens while ensuring a good field of view without the influence of the immersion medium, when an immersion objective lens is switched to the dry objective lens.

An aspect of the present invention is a microscope apparatus including a stage on which a specimen is placed, a dry objective lens and an immersion objective lens that collect light from the specimen on the stage, a lens switching portion that selectively disposes one of the dry objective lens and the immersion objective lens at a position facing the specimen, a relative-position changing portion that changes the relative positions of the stage and the immersion objective lens, and a control unit that controls the lens switching portion and the relative-position changing portion such that the relative positions in a direction perpendicular to an optical axis are changed until the immersion objective lens is disposed at a non-observation region of the dry objective lens, when observation with the immersion objective lens is switched to observation with the dry objective lens, prior to switching of these objective lenses.

According to this aspect, when observation with the immersion objective lens is switched to observation with the dry objective lens, prior to switching of these objective lenses, the control unit controls the lens switching portion and the relative-position changing portion. More specifically, the lens switching portion switches the objective lenses after the relative-position changing portion changes the relative positions of the stage and the immersion objective lens in the direction perpendicular to the optical axis until the immersion objective lens is disposed at a non-observation region of the dry objective lens.

As a result, almost all the liquid filling the space between the immersion objective lens and the slide glass (or cover glass) carrying the specimen is moved to the non-observation region of the dry objective lens together with the immersion objective lens due to the surface tension. Thus, the liquid can be removed from the observation region of the dry objective lens without providing a collection device, such as a pump, and the observation of the specimen can be performed with the dry objective lens while ensuring a good field of view.

In the above-described aspect, the relative-position changing portion may change the relative positions in the direction perpendicular to the optical axis after changing the relative positions in the optical axis direction within a distance such that the liquid between the immersion objective lens and the stage does not separate.

This configuration enables the liquid to be removed from the observation region of the dry objective lens while the contact area of the liquid and the cover glass carrying the specimen is reduced. This can reduce the amount by which the stage and/or the immersion objective lens are/is moved and can increase the efficiency of removing the liquid.

In the above-described aspect, the microscope apparatus may further include a removal portion for removing the liquid, provided in the non-observation region of the dry objective lens.

This configuration enables the liquid, having been moved to the non-observation region of the dry objective lens by the relative-position changing portion, to be removed with the removal portion.

The present invention provides an advantage in that liquid can be removed from the observation field of view of the dry objective lens, when the immersion objective lens is switched to the dry objective lens. In addition, the present invention provides an advantage in that the specimen can be observed with the dry objective lens while ensuring a good field of view without the influence of the immersion medium, when an immersion objective lens is switched to the dry objective lens.

DETAILED DESCRIPTION OF THE INVENTION

First Embodiment

A microscope apparatus 100 according to a first embodiment of the present invention will be described below with reference to FIGS. 1 to 4.

Figure 1:
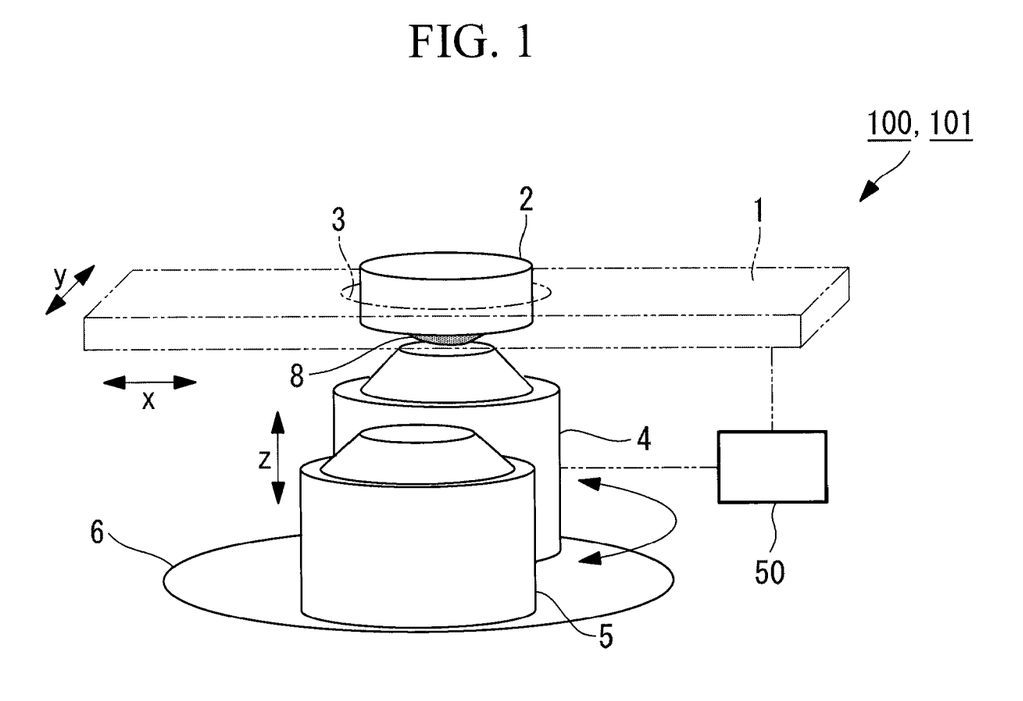
FIG. 1 is a schematic diagram of the configuration of a microscope apparatus according to first and second embodiments.

FIG. 1 shows, in outline, the structure of the microscope apparatus 100 according to this embodiment. As shown in FIG. 1, the microscope apparatus 100 includes a specimen XY stage 1 on which a specimen is placed, an immersion objective lens 4 and a dry objective lens 5 for collecting light from the specimen, a movable revolver (lens switching portion) 6 that switches between the immersion objective lens 4 and the dry objective lens 5, and a control unit 50 for controlling the specimen XY stage 1 and the movable revolver 6.

The specimen XY stage 1 includes a container holding portion 3 that holds a specimen container 2 containing the specimen, and is movable in directions (XY directions) perpendicular to the optical axes of the immersion objective lens 4 and the dry objective lens 5 in accordance with a command from the control unit 50. The movable revolver 6, to which the immersion objective lens 4 and the dry objective lens 5 are attached, is disposed below the specimen XY stage 1.

The specimen XY stage 1 is composed of an aluminum member whose surface is treated with black alumite, and the container holding portion 3 can be formed in various shapes according to the shape of the specimen container 2. The specimen container 2 has a transparent member, for example, a cover glass 7 having a thickness of about 0.17 mm, at the bottom thereof. Because many optical lenses are designed for the use with cover glasses of 0.17 mm thick, when an objective lens with a high numerical aperture (NA) is used for observation, in particular, when the immersion objective lens 4 is used, a cover glass of about 0.17 mm thick should be used in order to further increase the resolution.

The movable revolver 6 is movable in the optical axis direction (Z direction) of the immersion objective lens 4 and the dry objective lens 5 in accordance with a command from the control unit 50. By rotating the movable revolver 6 when switching between the immersion objective lens 4 and the dry objective lens 5, one of the immersion objective lens 4 and the dry objective lens 5 is selectively disposed at a position facing the specimen.

The control unit 50 controls the moving of the specimen XY stage 1 in the XY direction and the moving of the movable revolver 6 in the Z direction.

When observation with the immersion objective lens 4 is switched to observation with the dry objective lens 5, the control unit 50, prior to switching of these objective lenses, controls the specimen XY stage 1 and the movable revolver 6 such that the relative positions of the specimen XY stage 1 and the immersion objective lens 4 in the direction perpendicular to the optical axis are changed until the immersion objective lens 4 is disposed at a non-observation region of the dry objective lens 5.

In general, the process of observing a biological specimen proceeds as follows: after the entirety of the specimen is viewed with the low-magnification dry objective lens 5, a high-resolution image of a region of interest, selected from the entire image, is obtained with a high-magnification objective lens, namely, herein, the immersion objective lens 4.

The space between the tip of the immersion objective lens 4 and the cover glass 7 at the bottom surface of the specimen container is filled with liquid 8. For example, the index of refraction of the liquid 8 is 1.33 when ultrapure water is used as the liquid 8, and 1.52 when oil is used as the liquid 8.

Typically, objective lenses have a working distance (WD) and focus at a position a distance WD from the tip thereof. Thus, when an objective lens with a small WD and high NA is switched to another, it needs to be retracted in the Z direction before being switched so that the edge of the tip thereof does not hit the stage or the specimen.

Figure 2:
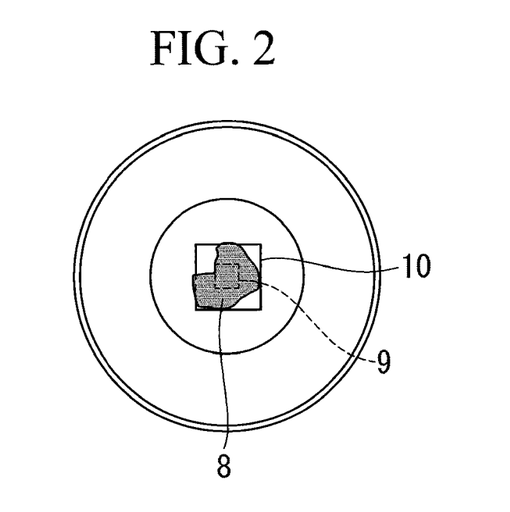
FIG. 2 is a diagram for explaining the position of liquid before a specimen XY stage is moved.

As shown in FIG. 2, when the immersion objective lens 4 is switched to the low-magnification dry objective lens 5, if the immersion objective lens 4 is retracted in an observation region 9 thereof in the Z direction and is switched to the dry objective lens 5, the liquid 8 remains at a low-magnification observation region 10 of the dry objective lens 5. The residue of the liquid 8 affects observation with the dry objective lens 5.

Figure 3:
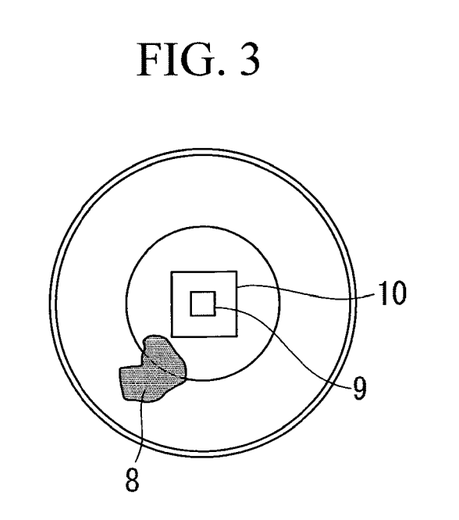
FIG. 3 is a diagram for explaining the position of the liquid after the specimen XY stage is moved.

To counter this, as shown in FIG. 3, by moving the specimen XY stage 1 located at the high-magnification observation region 9 to the non-observation region of the dry objective lens 5 and then lowering the immersion objective lens 4 in the Z direction, the residue of the liquid 8 can be removed from the low-magnification observation region 10 of the dry objective lens 5.

Note that the position to which the specimen XY stage 1 can be moved in the non-observation region is arbitrarily selectable. That is, the position of the liquid 8 may be within the range of the observation region 10 of the dry objective lens 5 as long as the observer can clearly observe the region of interest.

Figure 4:
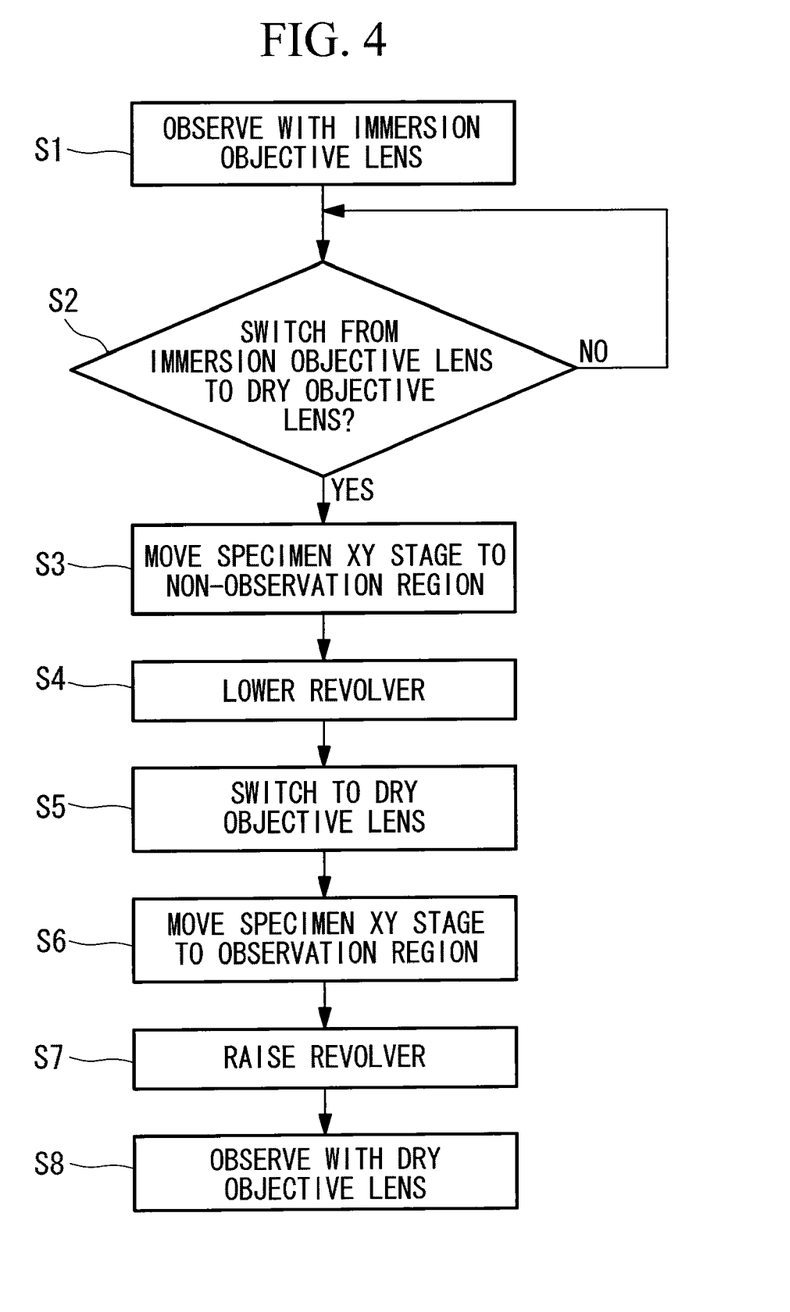
FIG. 4 is a flowchart showing an operation when the objective lenses of the microscope apparatus shown in FIG. 1 are switched from one to the other.

Now, a sequence of switching the objective lenses will be described with reference to FIG. 4.

First, observation with the immersion objective lens 4 is performed (step S1). When switching to the dry objective lens 5 is selected (step S2), the specimen XY stage 1 is operated to change the relative positions of the specimen XY stage 1 and the immersion objective lens 4 in the XY directions until the immersion objective lens 4 is disposed at the non-observation region of the dry objective lens 5 (step S3). As a result, the liquid 8 is moved to the non-observation region of the dry objective lens 5 due to the surface tension from the immersion objective lens 4.

Next, to prevent interference between the immersion objective lens 4 and the specimen XY stage 1, the movable revolver 6 is lowered in the Z direction (step S4).

Then, by rotating the movable revolver 6, the objective lens used for observation is switched from the immersion objective lens 4 to the dry objective lens 5 (step S5).

Next, the specimen XY stage 1 is operated again to bring the dry objective lens 5 to a position facing the low-magnification observation region 10 (step S6).

Then, the movable revolver 6 is raised in the Z direction (step S7), and observation with the dry objective lens 5 is performed (step S8).

In the above-described sequence, the order of the steps S6 and S7 may be reversed.

As has been described, with the microscope apparatus 100 according to this embodiment, when observation with the immersion objective lens 4 is switched to observation with the dry objective lens 5, almost all the liquid 8 filling the space between the immersion objective lens 4 and the cover glass 7 carrying the specimen is moved to the non-observation region of the dry objective lens 5 with the immersion objective lens 4 due to the surface tension. Thus, the liquid 8 can be removed from the low-magnification observation region 10 of the dry objective lens 5 without providing a collection device, such as a pump, and the observation of the specimen can be performed with the dry objective lens 5 while ensuring a good field of view.

Furthermore, a mechanism for vertically moving the lens and a mechanism for horizontally moving the stage, which are provided in typical microscope apparatuses, may serve dual purpose as the relative-position changing portion for changing the relative positions of the specimen XY stage 1 and the immersion objective lens 4 by moving the specimen XY stage 1 in the XY directions and the immersion objective lens 4 in the Z direction. This eliminates the need to provide a new driving mechanism serving as the relative-position changing portion and simplifies the structure of the apparatus.

As long as the relative-position changing portion can change the relative positions of the specimen XY stage 1 and the immersion objective lens 4 in the XYZ directions, it is not limited to the above-described structure.

Second Embodiment

A microscope apparatus according to a second embodiment of the present invention will be described below with reference to FIGS. 5 to 7.

A microscope apparatus 101 according to this embodiment differs from that according to the first embodiment in that, after the relative positions of the specimen XY stage 1 and the immersion objective lens 4 are changed in the Z direction to such a distance that the liquid 8 filling the space between the immersion objective lens 4 and the cover glass 7 does not separate, the relative positions thereof are changed in the XY directions. The microscope apparatus 101 according to this embodiment will be explained below focusing on the parts that differ from the first embodiment, while an explanation about the parts common to the first embodiment will be omitted. Since the structure of the apparatus is the same as that according to the first embodiment shown in FIG. 1, the same reference numerals as the first embodiment will be used for explanation.

Figure 5A:
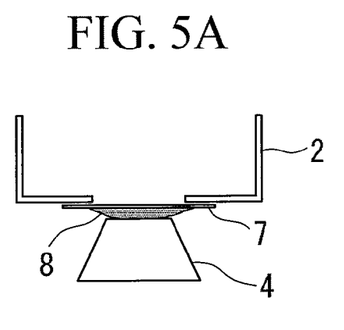
FIG. 5A is a cross-sectional view for explaining the state of liquid before an immersion objective lens is moved.
Figure 5B:
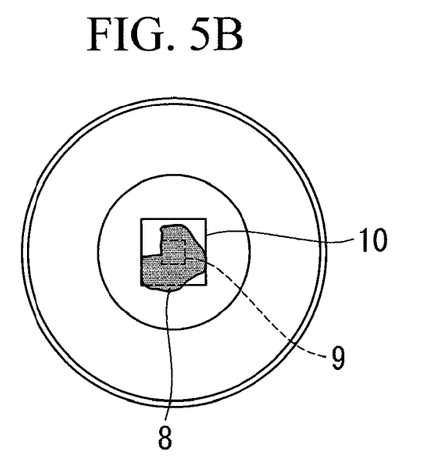
FIG. 5B is a top view for explaining the state of the liquid before the immersion objective lens is moved.
Figure 6A:
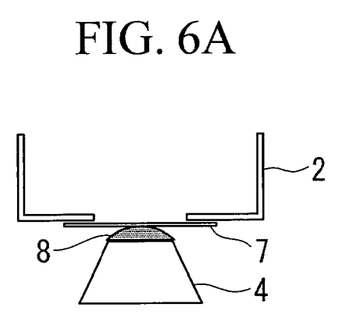
FIG. 6A is a cross-sectional view for explaining the state of the liquid while the immersion objective lens is being moved.
Figure 6B:
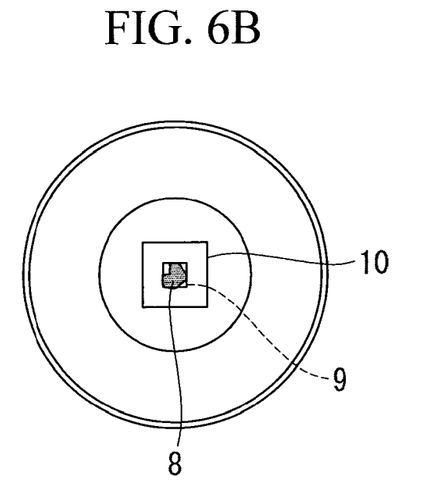
FIG. 6B is a top view for explaining the state of the liquid while the immersion objective lens is being moved.
Figure 7A:
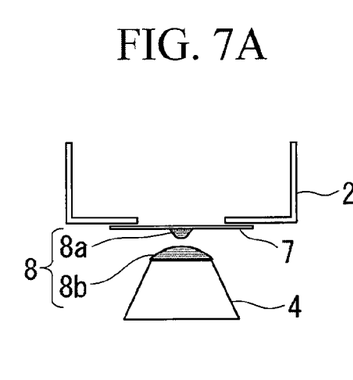
FIG. 7A is a cross-sectional view for explaining the state of the liquid after the immersion objective lens is moved.
Figure 7B:
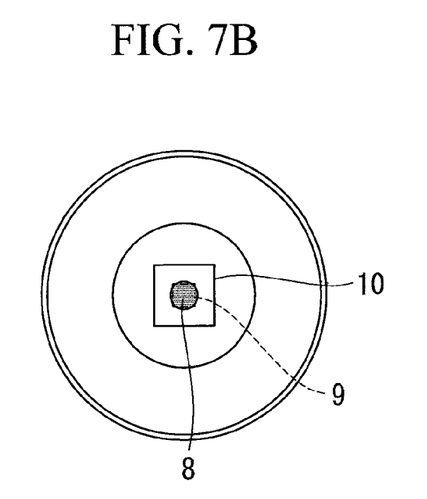
FIG. 7B is a top view for explaining the state of the liquid after the immersion objective lens is moved.

FIGS. 5 to 7 are diagrams for explaining the state of the liquid 8 filling the space between the immersion objective lens 4 and the cover glass 7. In each figure, A is a cross-sectional view and B is a top view.

As shown in FIGS. 5A and 5B, the liquid 8 fills the space between the tip of the immersion objective lens 4 and the cover glass 7 disposed on the bottom surface of the specimen container 2. The liquid 8 maintains a certain shape due to the surface tension between the cover glass 7 and the immersion objective lens 4 and is stable.

The equation of state for the surface tension (Young's equation) at this time is $$\sigma sv = \sigma sl + \sigma lv \cos \theta \quad (1)$$

where σsv is the solid-liquid interfacial energy, σsl is the solid-gas interfacial energy, and σlv is the gas-liquid interfacial energy.

The interfacial angle of contact (cos θ) can be obtained from Equation (1).

Furthermore, the movement of the immersion objective lens 4 in the Z direction changes the shape of the liquid 8.

Thus, normally, the contact area of the liquid 8 and the cover glass 7 increases by bringing the immersion objective lens 4, in a focused state, toward the surface of the specimen. On the other hand, as shown in FIGS. 6A and 6B, the contact area of the liquid 8 and the cover glass 7 decreases by bringing the immersion objective lens 4 away from the surface of the specimen. When the distance between the tip of the immersion objective lens 4 and the cover glass 7 exceeds a predetermined value, the liquid 8 separates into liquid 8a on the cover glass 7 and liquid 8b on the immersion objective lens 4, as shown in FIGS. 7A and 7B.

The distance at which the liquid 8 separates depends on the type of the liquid and the shape and material of the solid surface. The present inventor(s), as a result of diligent study, discovered that, in the case where the liquid 8 is about 100 µl of ultrapure water, the liquid separates when the distance between the cover glass 7 and the immersion objective lens 4 reaches about 3 mm. The inventor(s) also discovered that the contact area of the liquid 8 and the cover glass 7 is minimized when the distance between the cover glass 7 and the immersion objective lens 4 is about 2 mm, making the residue of the liquid less likely to remain on the cover glass 7 when the specimen XY stage 1 is operated.

As has been described, with the microscope apparatus 101 according to this embodiment, the liquid 8 can be removed from the low-magnification observation region 10 of the dry objective lens 5 while the contact area of the liquid 8 and the cover glass 7 carrying the specimen is reduced. This can reduce the amount by which the specimen XY stage 1 is moved and can increase the efficiency of removing the liquid 8.

Third Embodiment

A microscope apparatus according to a third embodiment of the present invention will be described below with reference to FIGS. 8 to 10.

A microscope apparatus 102 according to this embodiment differs from those according to the first and second embodiments in that the liquid 8 having moved to the non-observation region of the dry objective lens 5 is removed. The microscope apparatus 102 according to this embodiment will be explained below focusing on the parts that differ from the first and second embodiments, while an explanation about the parts common to the first and second embodiments will be omitted.

Figure 8:
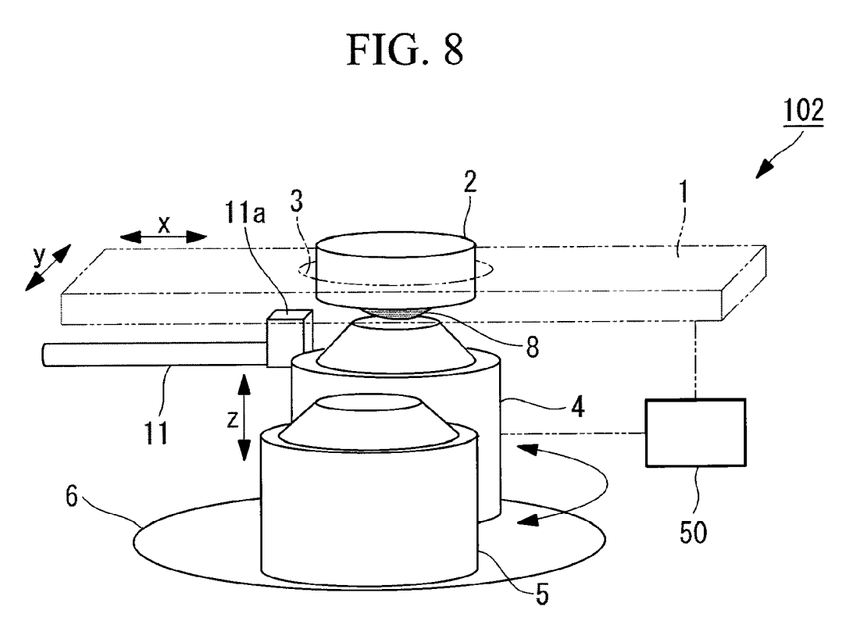
FIG. 8 is a schematic diagram of the configuration of a microscope apparatus according to a third embodiment.

As shown in FIG. 8, the microscope apparatus 102 includes, in addition to the structure shown in FIG. 1, a suction unit (removal portion) 11, such as a pump, for removing the liquid 8, provided in the non-observation region of the dry objective lens 5. The suction unit 11 includes, at the tip thereof, a suction portion 11a, such as a suction nozzle or a liquid absorbing member made of, for example, a porous material or a fibrous material. The suction portion 11a may have a thick structure.

The suction unit 11 and the specimen XY stage 1 can move relative to each other. For example, in the case of FIG. 8, the suction unit 11 is fixed and the specimen XY stage 1 is movable in the XY directions.

Figure 9:
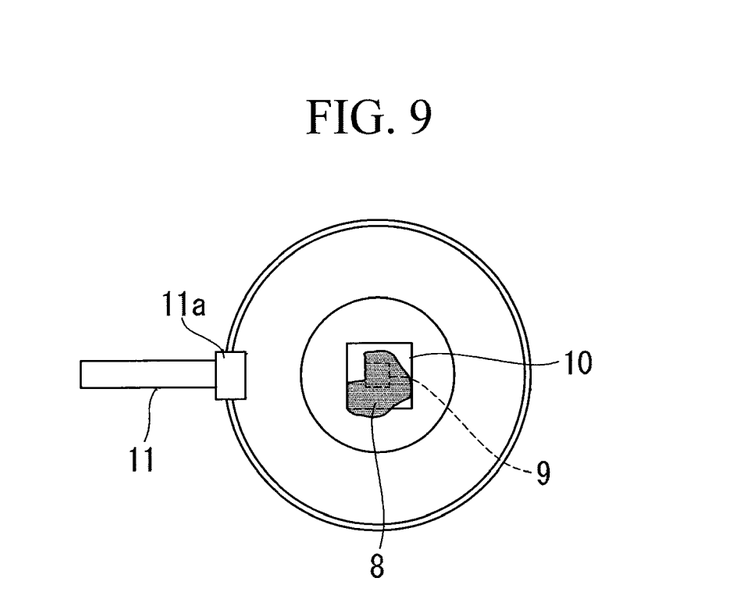
FIG. 9 is a diagram for explaining the position of liquid before the specimen XY stage is moved.
Figure 10:
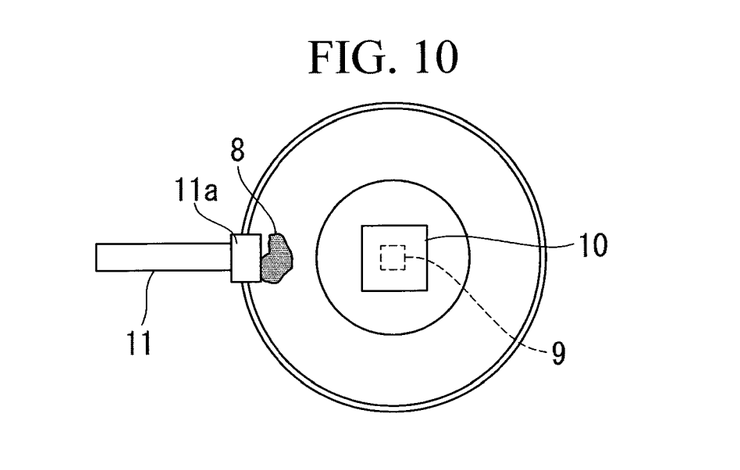
FIG. 10 is a diagram for explaining the position of the liquid after the specimen XY stage is moved.

With the above-described structure, as shown in FIGS. 9 and 10, after the liquid 8 is guided to the non-observation region of the dry objective lens 5 by moving the specimen XY stage 1 in the XY directions, the immersion objective lens 4 is retracted in the Z direction to be brought away from the liquid 8. Thereafter, the specimen XY stage 101 is further moved in the XY directions to move the liquid 8 deposited on the specimen to the suction portion 11a of the suction unit 11 in order to be removed by suction.

As has been described, with the microscope apparatus 102 according to this embodiment, by moving the specimen XY stage 1 in the XY directions, the liquid 8 having been moved to the non-observation region of the dry objective lens 5 due to the surface tension from the immersion objective lens 4 can be completely removed with the suction unit 11.

Furthermore, the suction portion 11a of the suction unit 11 may be configured to be able to reach the liquid 8 without touching the immersion objective lens 4, in a state in which the liquid 8 exists between the specimen and the immersion objective lens 4. The tip is preferably structured to have a size equal to or smaller than the WD of the immersion objective lens 4; however, a tip of another size can be used in conjunction with control for retracting the immersion objective lens 4 in the optical axis direction during suction as long as the space between the immersion objective lens 4 and the cover glass 7 is such that the liquid 8 does not separate (see the second embodiment). Examples of the specific structure include an extra-fine nozzle and an absorbing member having a thickness of about 1 mm.

The suction unit 11 may be provided with a moving mechanism, serving as a relative-position changing portion for the suction unit 11 and the specimen XY stage 1, that can be inserted into and removed from (the vicinity of) the tip portion of the immersion objective lens 4. Accordingly, after the liquid 8 is guided to the outside of the observation field of view by moving the specimen XY stage 1 in the XY directions, the suction portion 11a is inserted into the vicinity of the tip of the immersion objective lens 4 to suck the liquid 8.

Alternatively, the suction portion 11a may be attached to the lower surface of the specimen XY stage 1 (the surface facing the objective lens), at a position outside the observation field of view. Accordingly, the specimen XY stage 1 is moved in the XY directions to guide the liquid 8 to the position of the suction portion 11a to be removed by suction.

Although the removal portion has been described as a suction unit, such as a pump, in this embodiment, it may be a removal portion utilizing capillary action.

Alternatively, the removal portion may be a heater, and the liquid 8 brought thereto by the movement of the specimen XY stage 1 may be vaporized by the heat of the heater.

What is claimed is:

1. A control method of an objective lens of a microscope apparatus, the method comprising:
    performing an observation of a specimen on a stage with one of an immersion objective lens and a dry objective lens;
    selecting to switch from the immersion objective lens to the dry objective lens;
    changing a relative position of the immersion objective lens in a direction perpendicular to an optical axis so as to dispose the immersion objective lens in a non-observation region of the dry objective lens while keeping liquid between the immersion objective lens and the specimen due to surface tension, before switching the immersion objective lens to the dry objective lens;
    switching from the immersion objective lens to the dry objective lens;
    changing the relative position in the direction perpendicular to the optical axis back to an original position; and
    performing an observation of the specimen with the dry objective lens.

2. The control method according to claim 1, wherein the relative position in the direction perpendicular to the optical axis is changed after changing the relative position in the direction along the optical axis within a distance such that liquid between the immersion objective lens and the stage does not separate.

* * * * *